United States Patent [19]

Smith

[11] Patent Number: 4,713,497
[45] Date of Patent: Dec. 15, 1987

[54] SELF-STORING CORD AND REEL ASSEMBLIES FOR SHIELDED CABLES

[76] Inventor: John N. Smith, 2161 E. Gemini Dr., Tempe, Ariz. 85283

[21] Appl. No.: 384,729

[22] Filed: Jun. 3, 1982

[51] Int. Cl.⁴ .......................................... H02G 11/00
[52] U.S. Cl. ................................. 191/12.2 R; 439/164
[58] Field of Search .......................... 191/12.2 R, 12.4; 242/107.7; 339/5 RL, 6 RL, 8 RL

[56] References Cited

U.S. PATENT DOCUMENTS

| | | | |
|---|---|---|---|
| 1,730,104 | 10/1929 | Wheat | 191/12.4 |
| 2,590,890 | 4/1952 | Redo | 191/12.4 |
| 2,801,303 | 7/1957 | Pailing | 191/12.4 |
| 2,821,579 | 1/1958 | Benjamin | 191/12.4 |
| 2,856,470 | 10/1958 | Hyde | 191/12.4 |
| 2,860,197 | 11/1958 | Kost | 191/12.2 R |
| 2,976,374 | 3/1961 | Poulsen | 191/12.4 |
| 3,176,931 | 4/1965 | Hannay | 191/12.2 R |
| 3,337,695 | 8/1967 | Brown | 191/12.4 |
| 3,369,084 | 2/1968 | Cook | 191/12.4 |
| 3,585,324 | 6/1971 | Renndorer et al. | 191/12.4 |
| 4,378,473 | 3/1983 | Noorigian | 191/12.2 R |
| 4,384,688 | 5/1983 | Smith | 191/12.2 R X |

Primary Examiner—Robert B. Reeves
Assistant Examiner—John Pido
Attorney, Agent, or Firm—Warren F. B. Lindsley

[57] ABSTRACT

A retractable self-storing reel assembly for shielded and unshielded electrical cable employing a reel journaled in a casing having an integral hollow hub with one end of the hub providing an entranceway into the hub for the male end of an elongated cable coaxially of the reel and the outer periphery of the hub in the casing forming an opening for receiving one end of a cable mounted on the reel for connection to and termination in the hub. An outlet for the cable is provided in the casing in an area juxtapositioned to the periphery of the reel.

6 Claims, 10 Drawing Figures

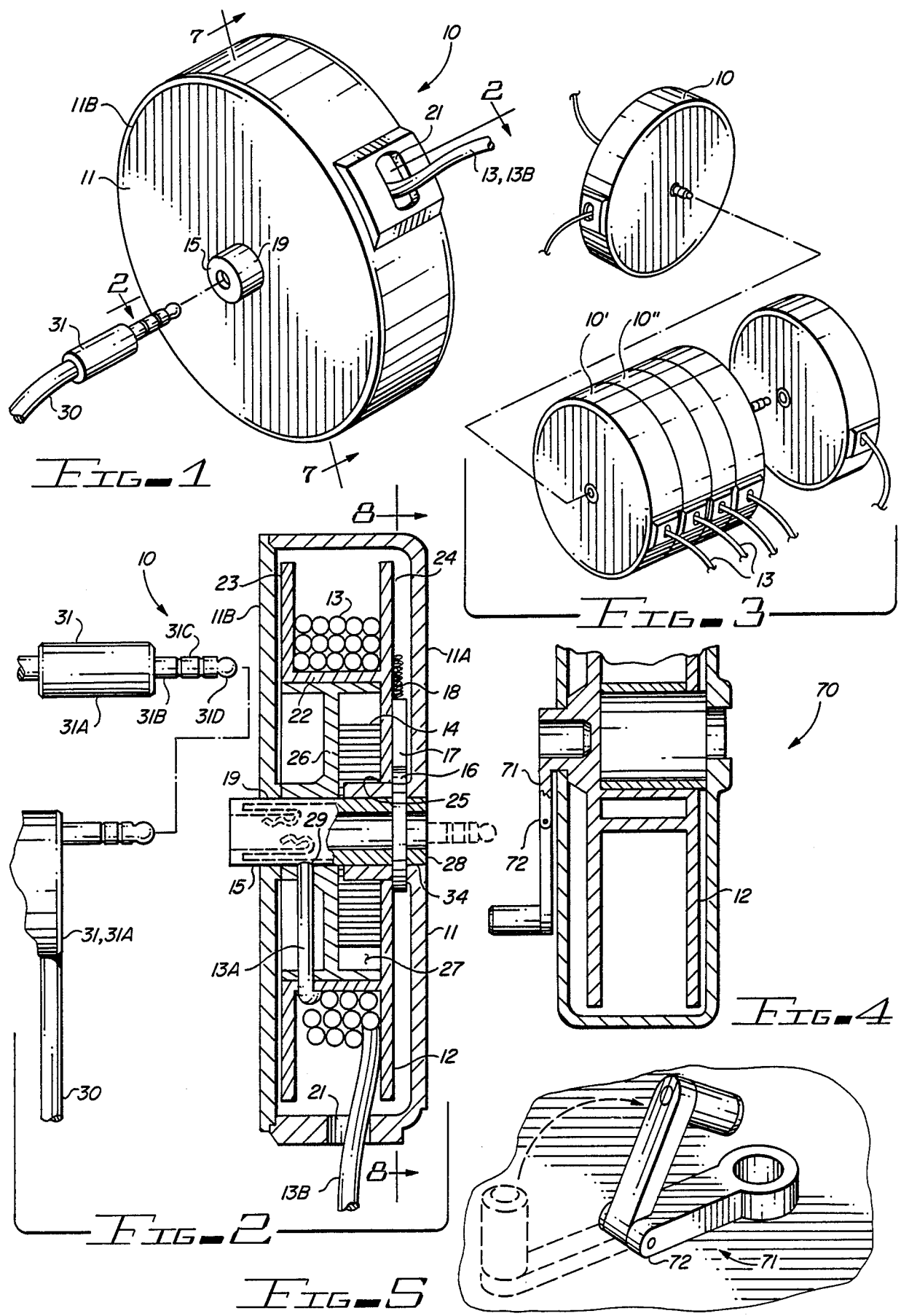

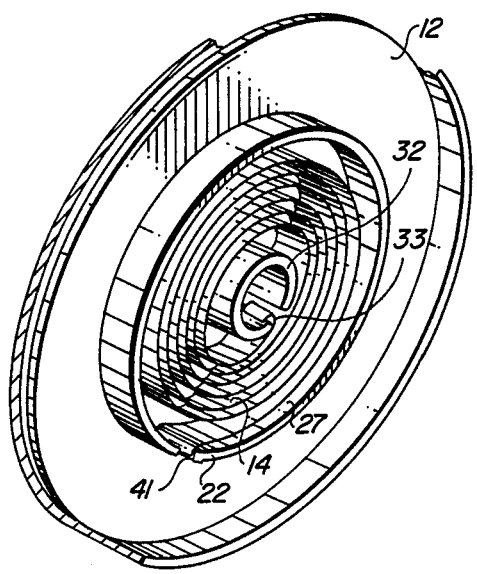
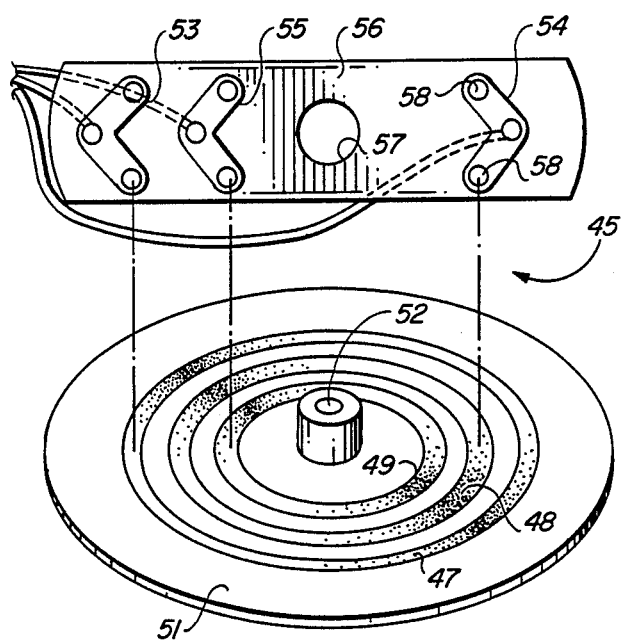
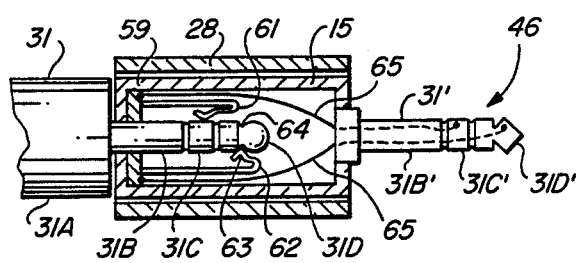
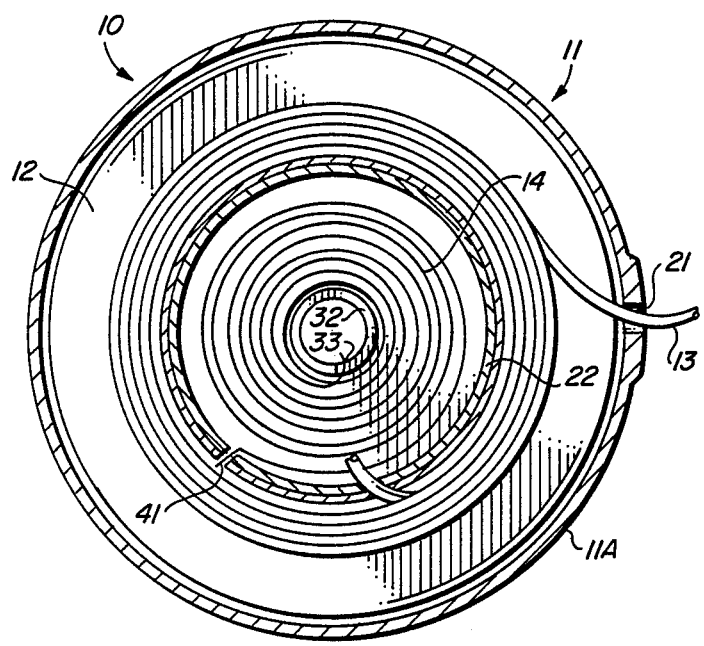
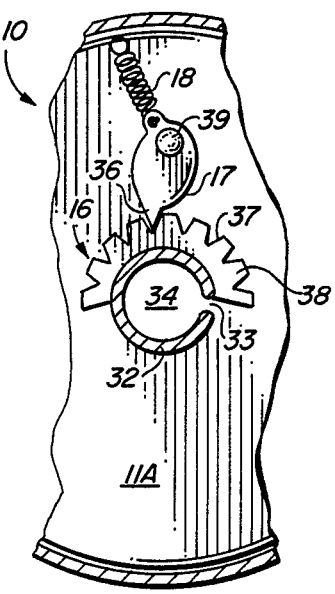

SELF-STORING CORD AND REEL ASSEMBLIES FOR SHIELDED CABLES

BACKGROUND OF THE INVENTION

Long, extendable, electrical cords, signal cables and the like, which preferably remain attached or connected at their source, present a problem relative to storage during periods in which they are not in use.

Telephon and electrical cords have been provided in spirals so that they may be stretched out for use with the flexibility of the spiraled cord, permitting it to retract partially to a more manageable length when not in use. Cords of this type, however, readily become twisted and tangled.

DESCRIPTION OF THE PRIOR ART

Various types of spring biased reels have been provided for automatically retracting the cord. To accommodate the rewinding of the cord without the attendant twisting at its connected end, commutating rings, brushes and the like have been used. For low-level signals, the methods employing commutating rings and brushes have not proven satisfactory because of the electrical noise generated by the brushes and rings. Another problem associated with this approach is that such assemblies are not amenable to shielding.

One self-retracting cord reel assembly utilizes the spiraled retracting spring as an electrical conductor, thereby eliminating the commutating element. Multiple nested springs provide electrical continuity for two or more electrical conductors. In cord and reel assemblies of this type, the electrical conductors are connected to the moving ends of the spiraled springs. A short connection cord is soldered to the fixed or stationary end of the spring, and a plug at the free end of the connection cord is plugged into an electrical outlet or signal source.

Another type of self-retracting cord and reel set recently introduced utilizes a pair of auxiliary drums mounted inside the rotating storage reel. One of the auxiliary drums rotates with the storage reel, while the other drum remains stationary and fixed to the mounting bracket. A portion of the source end of the cord is wound in opposite directions about the two drums. As the cord is withdrawn or retracted, a rotating sheave unwinds the cord from one of the auxiliary drums while winding it over the other. The winding and unwinding action on the two auxiliary drums permits the source end of the cord to remain permanently connected without twisting during storage and retraction. The cord or hose is continuous from end to end in this case, there being no commutating rings or rotating joints and no electrical connections made through the drive spring. This, however, is a relatively expensive approach to the reel storage problem.

In a device described by the inventor in a copending application, Ser. No. 266,726, filed May 26, 1981, now U.S. Pat. No. 4,384,688 and entitled, Self-Storing Cord and Hose Reel Assembly, a coiled portion of the signal cord serves as a continuous coupling between the rotating reel and the fixed end of the cord. The coiled portion of the cord, in this case, simply twists or coils and uncoils as the reel turns.

None of the cord or hose storage reels, as described above, is totally satisfactory for use with low-level signals and shielded cables. Those employing ordinary commutating slip rings produce electrical noise that interferes with their use in handling signal cables, such as telephone cords. The commutating types are also difficult to shield, especially the commutating elements themselves. Where electrical connections are made through the retracting springs, the problem of insulating between the nested springs adds to the cost of such an approach. The coiled cord approach cannot readily be applied in the case of a shielded cable, because the shield does not generally lend itself to being formed and flexed in such a manner.

What is needed is a self-storing reel that is simple and inexpensive, does not generate electrical noise, and readily lends itself to complete electrical shielding.

SUMMARY OF THE INVENTION

In accordance with the invention claimed, an improved self-storing reel is provided for use with shielded electrical signal cables carrying low-level electrical signals. The reel-and-cord assembly avoids the problems associated with conventional commutating rings and brushes while achieving a shielded, rotating electrical connection through the use of inexpensive, commercially available connector parts.

It is, therefore, one object of the present invention to provide an improved self-storing reel for retractable electrical signal cables.

Another object of the invention is to provide a self-storing reel for use with signal cables which is free of the electrical noise problems generally associated with conventional slip ring and brush assemblies.

A further object of this invention is to provide a reel assembly in which the cord or cable may be extended or retracted freely as it unwinds or rewinds on the reel.

Yet another object of this invention is to provide such an assembly in a form that is simple in construction and inexpensive to manufacture.

Further objects and advantages of the invention will become apparent as the following description proceeds; and the features of novelty which characterize the invention will be pointed out with particularity in the claims annexed to and forming a part of this specification.

BRIEF DESCRIPTION OF THE DRAWINGS

The present invention may be more readily described with reference to the accompanying drawings, in which:

FIG. 1 is a perspective view of an improved self-storing cord or cable assembly embodying the invention;

FIG. 2 is a cross-sectional view of FIG. 1 taken along the line 2—2;

FIG. 3 is a perspective view showing a number of cord and reel assemblies of the invention ganged together to permit distribution from a common signal source via a multiplicity of individually retractable cords or cables;

FIG. 4 is a partial cross-sectional view of a simplified embodiment of the invention in which the cord or cable is retracted manually by means of a hand crank;

FIG. 5 is a partial perspective view of the assembly of FIG. 4 showing the hand crank that is employed for retraction;

FIG. 6 is a perspective view of a part of the rotating reel assembly of FIGS. 1-3 showing a spring that is mounted in the spring cavity thereof;

FIG. 7 is a cross-sectional view taken along line 7—7 of FIG. 1;

FIG. 8 is a partial cross-sectional view of FIG. 2 taken along line 8—8;

FIG. 9 is a perspective view of a typical commutating ring and brush assembly shown partially disassembled; and FIG. 10 is a cross-sectional view of the rotating joint assembly employed in the present invention.

DESCRIPTION OF THE PREFERRED EMBODIMENT

Referring more particularly to the drawings by characters of reference, FIGS. 1, 2 and 6–8 disclose an improved self-storing cord reel or cord reel assembly 10 comprising a housing or case 11, a storage reel 12, a cord 13, a spiraled torsion return spring 14, a cord termination socket 15, a ratchet gear 16, pawl 17 and a coil spring 18.

Case 11 may be of any suitable geometrical configuration but is illustrated in FIGS. 1 and 2 in the form of a short cylinder molded or formed in two parts. The first part 11A comprises a shallow cup, and the second part 11B comprises a circular plate having a centered circular opening 19 in which the cord termination socket 15 is installed. Part 11B serves as a cover for the open end of part 11A in the final assembly of cord reel assembly 10. A slot 21 in the cylindrical side surface of part 11A serves as a port for the emergence of the extendable end of cord 13.

The storage reel 12 stores cord 13 in the usual manner over an outer cylindrical shelf 22 positioned between two disc-shaped side walls 23 and 24. Side wall 24 is a solid circular plate except for a small, centered, circular hole 25. Side wall 23 has an inner diameter equal to the diameter of the outer surface of cylindrical shelf 22 to which it is joined. The outer diameters of walls 23 and 24 are approximately equal.

A circular support reel or wheel 26 fits inside the cylindrical shelf 22 and is joined at its outer diameter to the inner surface of shelf 22. Wheel 26 has its flat, circular surface arranged parallel with wall 24 and is spaced apart from wall 24 a distance less than the width of shelf 22 so that a spring cavity 27 is formed between wall 24 and wheel 26 for the containment of spring 14. Cavity 27 is concentric with shelf 22, its outer diameter coinciding with the inner diameter of shelf 22. Wheel 26 is secured at its center to the outer cylindrical housing 28 of the cord termination socket 15, with housing 28 serving as an axle for wheel 26. Housing 28 is rotatably supported at one end within the circular opening 19 of part 11B and is similarly rotatably supported at its other end within opening or circular hole 34 in part 11A of case 11.

Connection of cord 13 to socket 15 is made by passing the source end 13A of cord 13 through a hole 29 on one side of housing 28. The individual conductors of cord 13 are soldered to the terminals of socket 15. From hole 29, cord 13 extends to shelf 22, its remaining length being wound over shelf 22 of reel 12, and its extendable end 13B passing out of case 11 through slot 21. It should be noted that shielded and unshielded cables are readily available in the marketplace embodying both phone jacks and phono jacks already attached thereto and their cooperating plugs.

Socket 15 is a common form of an ordinary phone jack. As shown in FIGS. 1 and 2, cord 13 is energized by connection to a signal or energy source using an external cord or cable 30. Cable 30 is terminated in a phone plug 31 which plugs into the mating socket 15.

Phone plugs of various types are available, as suggested by FIGS. 1 and 2, including versions in which the cord leaves the plug at a right angle or in a direction aligned with the body of the plug. In any case, plug 31 employed in the practice of the invention is of the coaxial type in which shell 31A is preferably of an electrically conductive material for shielding purposes. Jacks and plugs may be single or multiconductor. Electrical contact between plug 31 and jack or socket 15 is made at the cylindrical surface of plug 31 which is divided into three segments 31B, 31C and 31D. Segment 31B is adjacent and integral with shell 31A and makes the shield or ground connection to socket 15. Segment 31D is at the leading end or tip of plug 31, and segment 31C is positioned between segments 31B and 31D. Segments 31B, 31C and 31D are electrically isolated from each other to permit the utilization of segments 31C and 31D for carrying electrical signals while segment 31B provides continuity of the ground connection. It will be noted that when plug 31 is installed in socket 15, socket 15 is free to rotate in reel 12 while plug 31 remains stationary in case 11.

Ratchet gear 16, as shown in FIG. 8, is in the form of a semicircle with teeth 38 cut into its outer circular periphery. Gear 16 is integrally molded with part 11A of case 11, or it may be rigidly secured thereto at the center of the inside surface of part 11A. The axial center of gear 16 is aligned with the center of part 11A. A post-type arbor 32 forming a spring retainer extends perpendicularly from the face of gear 16 along its axis into cavity 27 and is provided with a longitudinal slot 33 at a point on its circumference for receiving and holding the inner end of coil spring 14. Circular hole 34 is formed along the axis of gear 16 to receive housing 28 of socket 15.

Pawl 17 associated with ratchet gear 16 is pivotally mounted to the outer surface of wall 24 of reel 12 in a position such that when housing 28 is journaled in hole 34, pointed tooth 36 of pawl 17 may be dropped into one of notches 37 between teeth 38 of gear 16. A pivot pin 39 passes through one end of pawl 17 and into wall 24 to serve as the pivotal mounting means for pawl 17. One end of spring 18 is attached to an edge of pawl 17 adjacent pin 39, and the other end of spring 18 is secured to a point on wall 24 such that spring 18 urges tooth 36 of pawl 17 into engagement with gear 16.

It should be noted from FIGS. 6 and 7 that the outer end of spring 14 is hooked into a slot 41 of shelf 22, and the inner end of spring 14 hooks into post arbor 32, as previously described.

To permit the installation of spring 14 in cavity 27, reel 12 is molded in the two parts 11A and 11B, with spring 14 being installed in cavity 27 before the two parts are assembled together.

ASSEMBLY OF STRUCTURE

The claimed cord and reel configuration is assembled by first passing the source end 13A of cord 13 through slot 21 of part 11A of case 11. End 13A is then passed through hole 29 of socket housing 28 into the hollow interior thereof, as viewed in FIG. 2. The individual conductors of cord 13 at end 13A are then soldered to the terminals of socket 15, after which socket 15 is pressed into position in the end of housing 28. It should be noted, other types of cords can be used with plugs assembled thereon.

Reel 12 is then positioned inside part 11A of case 11 while inserting housing 28 in hole 34. As reel 12 is moved into position, it is rotated relative to case 11 so that pawl 17 will fall into place as it reaches a position opposite the toothed side of ratchet gear 16. Also as reel 12 is rotated, the inner end of spring 14 engages slot 33 of post arbor 32.

Following the installation of reel 12 in part 11A, as just described, part 11B is positioned over the open end of part 11A while passing the end of housing 28 through hole 19.

When cord reel assembly 10 is utilized for telephone or similar installations, case 11 is secured to a wall. For this purpose, a swinging bracket may be employed which permits the case to swing outwardly for use and then to be returned by a spring to a flush position against the wall when not in use. Alternatively, case 11 may be partially set back into a wall opening. In either type of installation, case 11 remains fixed, i.e. the case does not rotate as the cord is withdrawn. As reel 12 rotates, socket 15 rotates around plug 31, these two parts thus constituting a form of slip ring and brush assembly, as will be described in more detail in a later portion of this specification.

As reel 12 rotates during the withdrawal of cord 13, pawl 17, as shown in FIG. 4, is rotated counter-clockwise past ratchet gear 16. During such counter-clockwise rotation, pawl 17 pivots about pin 39 so that tooth 36 is dragged past teeth 38 without interference. If tension on cord 13 is released as pawl 17 is passing over the toothed portion of gear 16, spring 14 will cause reel 12 to move pawl 17 in a clockwise direction past teeth 38, in which case tooth 36 will engage one of the notches 37 and will thereby lock the position of reel 12 and prevent spring 14 from retracting cord 13. To release such locking action, the user of the cord reel assembly 10 may withdraw cord 13 a short distance until the pawl clears the toothed portion of gear 16. Spring 14 will then complete the retracting action.

Phone plug 31 and its socket 15 serve two purposes: they provide, firstly, a means for connection of the external signal from its source; secondly, they accommodate the rotation of the reel without the aid of any additional parts. Because the phone plug is a widely used part and is produced in large quantities, it is especially cost effective for use in this application.

In its use as a means for providing a rotating electrical connection, the phone jack offers certain advantages over the conventional form of slip ring assembly. These advantages are most readily recognized by comparison of the conventional slip ring assembly 45 of FIG. 9 with phone jack assembly 46 of FIG. 10.

In the assembly 45 of FIG. 9, three circular slip rings 47, 48 and 49 are shown mounted on a disc 51. As disc 51 is rotated about its axle 52, three spring-contacts 53, 54 and 55 are positioned over rings 47, 48 and 49, respectively, to make electrical contact between the moving rings and the respective stationary contacts. Contacts 53, 54 and 55 are mounted on a support member 56 that has a circular opening 57. When member 56 is positioned over disc 51 for operations, opening 57 fits over axle 52 to insure the proper positioning and orientation of contacts 53-55 relative to rings 47-49. In order to achieve as good electrical contact as possible, two contact pads 58 are provided on each of contacts 53-55. Both of the contact pads 58 of a given contact 53, 54 or 55 ride on the same ring 47, 48 or 49.

Limitations associated with assembly 45 include the following: for each rotation of disc 51, contacts 53-55 must travel a complete circumference of the associated rings 47-49. The distance of travel and the relative speed of travel result in a significant degree of wear as experienced by both the contacts and the rings. Any irregularities in the surfaces of the rings can cause the contacts to bounce or vibrate, producing degradation of contact quality which results in electrical noise. To deal with contact and ring wear, some form of lubrication is commonly employed; but as the lubricant picks up dust and other forms of contamination, the contact quality is further impaired. In addition to the tendency for producing electrical noise due to the considerations just described, it is difficult to shield assembly 45 to reduce its susceptibility to electromagnetic radiation or to prevent radiation from the assembly to other devices.

In phone jack assembly 46 of FIG. 10, a stationary phone plug 31 is shown installed in the rotating female jack or socket 15 of the present invention. Socket 15 is shown secured within housing 28 for further correlaton with assembly 10. As in the typical use of phone plug 31, segment 31b, which is electrically common with shell 31A, makes electrical contact with metal shell 59 of socket 15. Two spring contacts 61 and 62 incorporated in socket 15 bear against segments 31C and 31D, respectively, to make the signal connections. A V-shaped bend 63 in contact 62 drops into an annular V-shaped depression 64 of segment 31D as plug 31 is installed. The position of bend 63 relative to depression 64 is such that spring 62 urges plug 31 toward socket 15 to insure mechanical and electrical contact between the mating surfaces thereof which make the ground contact between plug and socket.

When assembly 46 is employed as a rotating electrical joint, as in the practice of the present invention, it will be immediately recognized that a considerably shorter travel distance per revolution between the mating electrical contact surfaces is involved in this case than for assembly 45. Also, for a given rotational velocity, the linear velocity of the contact point relative to the surface of segment 31B, 31C or 31D is considerably less than the corresponding velocities for assembly 45. Furthermore, the chromeplated contacts and mating surfaces of plug 31 require no lubrication. These factors combine to produce virtually noise-free operation, as confirmed by tests on a working model of the invention. Assembly 46 has the further advantage that in its commercially available form, both plug 31 and jack or socket 15 are available in both electrically shielded and unshielded cases 31A and 59. Heretofore, any telephone use of a rotating connection has been unsatisfactory.

Socket 15, as shown in FIG. 10, is of a special type in that it has at its right-hand end an extending male plug 31' that may be employed in a second embodiment of the present invention. Plug 31' has three segments 31B', 31C' and 31D'. Segment 31B' is integral with case 59 of socket 15; and segments 31C' and 31D' are connected to contacts 61 and 62, respectively, by wires or conducting strips 65 internal to socket 15. Thus, when plug 31 is installed as shown, connection is made between segments 31B, 31C and 31D and the corresponding segments 31B', 31C' and 31D'. Accessible terminals in socket 15 permit connection of cord 13 during the assembly of cord and reel assembly 10.

In the first embodiment of the invention, the extending male plug 31' is not present; but in the second embodiment, extending plug 31', which is also shown in FIG. 2 as a ghost image, permits the ganging together of several cord and reel assemblies 10, 10', 10'', etc., as shown in FIG. 3.

Where several cord and reel assemblies are ganged together as in FIG. 3, the signal source is introduced through a cord 30 to the first assembly 10, as described for the first embodiment of the invention. It is carried from assembly 10 to assembly 10' by the extending plug 31 of assembly 10 to the socket 15' of assembly 10'. In like manner, the signal from assembly 10' is carried to assembly 10", etc. Each of the assemblies 10, 10', 10", etc., may be individually accessed by withdrawing its cord 13. In this way, such a ganged assembly might readily be employed for use in making conference calls where several people may wish to be connected by individual phone sets to the same signal source. In such a situation, the individual cords may be withdrawn as needed to permit the participants to be seated at any convenient location in the room. This removes the need for having permanent wiring installed for such purposes. Such permanent wiring is not always desirable because it is expensive and it fixes furnature location. In addition, the storage of multiple cords used in connecting amplifiers to speakers and from musical instruments to amplifiers may be simplified by the desired invention and also may be used to extend direct or alternating current from a single source to one or more points or devices.

A third embodiment of the invention, as shown in FIGS. 4 and 5, is a simplified version of assembly 10 in which the spring return has been eliminated. In the cord and reel assembly 70 of FIGS. 4 and 5, a handle 71 is attached to the reel. Handle 71 is employed to rewind the cord after it has been withdrawn for use. It has a hinge 72 at its center so that it may be folded upon itself when it is not being used for retraction of the cord.

An effective, inexpensive and versatile cord and reel assembly is thus provided, in accordance with the stated objects of the invention. Although but a few embodiments of the invention have been illustrated and described, it will be apparent to those skilled in the art that various changes and modifications may be made therein without departing from the spirit of the invention or from the scope of the appended claims.

What is claimed is:

1. A retractable self-storing reel assembly for shielded and unshielded electrical cables comprising:
   a casing,
   a reel journaled for rotation in said casing,
   said reel comprising an integral hollow hub, the inner periphery of which comprises a cable terminating socket,
   a spring mounted within said casing to extend between said casing and said reel for rotatively biasing said reel in one direction,
   a ratchet means extending between the inside periphery of said casing and said reel for controlling the rotational movement of said reel in a second rotative direction opposite to said first rotative direction,
   one end of said hub providing an entranceway into said hub for the male end of an elongated first cable coaxially of said reel, and the outer periphery of said hub in said casing forming an opening for receiving one end of a second cable mountable on said reel for connection to and termination in said hub, and
   means providing an outlet in said casing for said second cable mountable on said reel in an area juxtapositioned to the peripery of said reel.

2. The retractable self-storing reel assembly set forth in claim 1 in further combination with:
   said second cable comprising a first end which extends through said opening in said hub into said entrance-way and terminates in said hub, a coiled portion integral with said first end which is wound on said reel with the remainder of said coiled portion and the other end of said second cable extending outwardly through said outlet in said casing, and
   a male plug forming a part of said first cable extending into said entranceway of said hub to complete an electric circuit through the assembly.

3. The retractable self-storing reel assembly set forth in claim 2 wherein:
   said first cable comprises a shielded electrical cable.

4. The retractable self-storing reel assembly set forth in claim 2 wherein:
   said spring comprises a spiraled torsion spring mounted in a cavity formed in said reel and coaxially to said hub.

5. The retractable self-storing reel assembly set forth in claim 4 wherein:
   said second cable is wound on said reel at a greater radial distance from the axis of said reel than the outer periphery of said spring.

6. The retractable self-storing reel assembly set forth in claim 1 wherein:
   the other end of said hub is provided with a male plug extending coaxially outwardly thereof for axial connection with a second said reel assembly.

* * * * *